(12) United States Patent
Kampf et al.

(10) Patent No.: US 10,514,129 B2
(45) Date of Patent: Dec. 24, 2019

(54) HYBRID TANKS

(71) Applicant: AMTROL Licensing Inc., West Warwick, RI (US)

(72) Inventors: Christopher Kampf, Moosup, CT (US); Christopher A. Van Haaren, Warwick, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 173 days.

(21) Appl. No.: 15/367,911

(22) Filed: Dec. 2, 2016

(65) Prior Publication Data

US 2018/0156388 A1 Jun. 7, 2018

(51) Int. Cl.
  *F24D 3/10* (2006.01)
  *F17C 1/06* (2006.01)
  *F17C 1/10* (2006.01)

(52) U.S. Cl.
  CPC .............. *F17C 1/06* (2013.01); *F17C 1/10* (2013.01); *F17C 2201/0109* (2013.01); *F17C 2203/0619* (2013.01); *F17C 2203/0636* (2013.01); *F17C 2203/0663* (2013.01); *F17C 2209/2154* (2013.01); *F17C 2209/221* (2013.01)

(58) Field of Classification Search
  CPC ...... F17C 1/06; F17C 1/00; F17C 1/10; F17C 3/1016; F17C 2201/0109; F17C 2203/0619; F17C 2203/0636; F17C 2203/0663; F17C 2203/0604; F17C 2209/2154; F17C 2209/221
  USPC ....... 220/589, 586, 721, 723, 4.12, 588, 581
  See application file for complete search history.

(56) References Cited

U.S. PATENT DOCUMENTS

| | | | |
|---|---|---|---|
| 4,165,951 A | 8/1979 | Friedman et al. | |
| 4,241,843 A | 12/1980 | Walker et al. | |
| 4,313,400 A | 2/1982 | Walker et al. | |
| 4,337,824 A | 7/1982 | Kirk | |
| 4,344,645 A | 8/1982 | Kirk | |
| 4,403,385 A | 9/1983 | Kirk | |
| 4,471,907 A | 9/1984 | Gerstmann | |
| 4,474,215 A * | 10/1984 | Richter | F15B 1/125 138/30 |
| 4,546,819 A | 10/1985 | O'Connor | |
| 4,836,409 A | 6/1989 | Lane | |
| 4,921,214 A | 5/1990 | Jernberg | |

(Continued)

FOREIGN PATENT DOCUMENTS

WO          8728401          8/1997

*Primary Examiner* — Andrew T Kirsch
*Assistant Examiner* — Elizabeth J Volz
(74) *Attorney, Agent, or Firm* — Tucker Ellis LLP; Carlos Garritano

(57) ABSTRACT

A commercial hybrid tank includes a metal liner with an upper wall and a lower wall. The upper wall and the lower wall define a cavity therebetween. A weld joint joins the upper and lower walls together. A fiber winding layer is wrapped around an outer surface of the metal liner. A method for manufacturing a commercial hybrid tank includes overlapping surfaces of an upper wall and a lower wall to form a metal liner defining a cavity. The method includes joining the surface of the upper wall and the surface of the lower wall together by welding to form a weld joint between the upper wall and the lower wall. The method includes wrapping the metal liner with a fiber winding layer around an outer surface of the metal liner to form a hybrid tank.

16 Claims, 4 Drawing Sheets

(56) References Cited

U.S. PATENT DOCUMENTS

| | | |
|---|---|---|
| 5,111,879 A | 5/1992 | Jozwiak et al. |
| 5,386,925 A | 2/1995 | Lane |
| 5,551,590 A | 9/1996 | Mazur et al. |
| 5,657,790 A | 8/1997 | Mohn |
| 5,691,406 A | 11/1997 | Lane et al. |
| 5,758,820 A | 6/1998 | Celorier, Jr. et al. |
| 5,778,679 A | 7/1998 | Celorier, Jr. et al. |
| 5,794,660 A | 8/1998 | Mohn |
| 6,957,799 B2 | 10/2005 | Heilmann et al. |
| 7,032,628 B2 | 4/2006 | Guillemette et al. |
| 7,048,861 B2 | 5/2006 | Beretta, III |
| 7,100,683 B2 | 9/2006 | Heilmann et al. |
| 7,216,673 B2 | 5/2007 | Gremour et al. |
| 7,255,245 B2 * | 8/2007 | Oliveira .................... F17C 1/04 220/586 |
| 7,287,663 B2 | 10/2007 | Vandal et al. |
| 7,671,754 B2 | 3/2010 | Heilmann et al. |
| 7,699,188 B2 | 4/2010 | Oliveira et al. |
| 7,935,206 B2 | 5/2011 | Oliveira et al. |
| 8,215,517 B2 | 7/2012 | Chohfi et al. |
| 8,739,823 B2 | 6/2014 | Van Haaren et al. |
| 8,919,598 B2 | 12/2014 | Kampf et al. |
| 8,944,278 B2 | 2/2015 | Chohfi et al. |
| 2004/0173624 A1 | 9/2004 | Carter |
| 2005/0087537 A1 | 4/2005 | Kimbara et al. |
| 2006/0000839 A1 | 1/2006 | Gremour et al. |
| 2006/0131314 A1 | 6/2006 | Lombari et al. |
| 2006/0144843 A1 | 7/2006 | Vandal et al. |
| 2009/0071965 A1 | 3/2009 | Iida et al. |
| 2010/0230422 A1 * | 9/2010 | Illesi ........................ F17C 1/06 220/586 |
| 2012/0048862 A1 * | 3/2012 | Otsuka .................... F17C 13/06 220/495.01 |
| 2014/0158573 A1 * | 6/2014 | Van Haaren .......... F16L 55/053 206/459.1 |

\* cited by examiner

HYBRID TANKS

BACKGROUND

1. Field of the Invention

The present invention generally relates to well and expansion tanks and, more particularly, to commercial well and expansion tanks.

2. Description of Related Art

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. The proper pre-charge will continue to keep the diaphragm/bladder away from the tank wall. If the pre-charge pressure is not enough to provide an air volume appropriate for the water supply pressure, the diaphragm/bladder will fill the air cell. If eventually the diaphragm/bladder "bottoms out" on the tank wall, the tank becomes ineffective in the function it has been design to provide. An example of a non-metallic conventional expansion tank assembly is provided in U.S. Pat. No. 7,216,673 to Gremour et al. Gremour et al. discloses a non-metallic, diaphragm-type tank assembly for use with a pressurized water system. The disclosure of U.S. Pat. No. 7,216,673 to Gremour et al. is incorporated by reference herein in its entirety. Other conventional expansion tanks can be made from metal, as described in U.S. Pat. No. 7,287,663 to Vandal et al. The disclosure of U.S. Pat. No. 7,287,663 to Vandal et al. is incorporated by reference herein in its entirety.

Some tanks, defined as type III tanks, can have a metal liner with fiber winding around the metal liner. Traditional Type III composite tanks are used in consumer applications, e.g. personal use gas cylinders. An example of a consumer Type III tank is provided in U.S. Pat. No. 7,255,245 to Oliveira et al. The disclosure of U.S. Pat. No. 7,255,245 to Oliveira et al. is incorporated by reference herein in its entirety. Traditional Type III tanks have been considered satisfactory for their intended purpose, however, there is ongoing need in the art for improved Type III tanks.

SUMMARY

A commercial hybrid tank includes a metal liner with an upper wall and a lower wall. The upper wall and the lower wall define a cavity therebetween. A weld joint joins the upper and lower walls together. A fiber winding layer is wrapped around the outer surface of the metal liner.

In accordance with some embodiments, the metal liner has an outer diameter ranging from 11 to 26 inches. A ratio of a wall thickness of the metal liner to the outer diameter of at least one of the upper wall or lower wall can range from 0.0028 to 0.0032. The tank can have a pressure rating of up to 300 psi at 240° F. The tank can withstand a hydrostatic pressure test of five times its pressure rating at 240° F.

The liner can define a longitudinal liner axis. The fiber winding layer can be formed of fiber windings helically and circumferentially wrapped with respect to the longitudinal liner axis around the outer surface of the liner. The tank can include a flexible diaphragm positioned within the cavity connected to an inner diameter surface of the lower wall. The diaphragm can separate the cavity into an upper portion and a lower portion. The upper portion of the cavity can be sealed to contain a pressurized gas and the lower portion is sealed to contain a pressurized liquid. The tank can include an inner hoop ring operatively connected to an inner surface of the flexible diaphragm to hold the flexible diaphragm in place against the lower wall.

The upper wall can include an upper dome and a dome extension and/or a cylindrical extension. The weld joint can be a first weld joint and the upper wall can include a second weld joint defined between the upper dome and either the dome extension or the cylindrical extension bonding the upper dome to the dome extension or the cylindrical extension. The first weld joint can be defined between at least one of the dome extension or the cylindrical extension of the upper wall and the lower wall of the liner. The weld joint can include a weld bead. The weld bead can extend radially outward from the outer surface of the metal liner 0.125 inches or less.

In some embodiments, the liner includes an opening with a connector positioned therein. The connector can be defined in the upper wall of the liner. The connector can include a central collar operatively connected to the opening of the liner. The central collar can define a longitudinal axis and an axial passage. A support plate can be nested within the opening of the liner axially below the central collar. The support plate can include a hole defined therein. The connector can include an air stem extending from the hole of the support plate through the axial passage of the central collar. The connector can be defined in the lower wall of the liner. The lower wall can include a lower dome.

In accordance with another aspect, a method for manufacturing a commercial hybrid tank includes overlapping surfaces of an upper wall and a lower wall to form a metal liner defining a cavity. The method includes joining the surface of the upper wall and the surface of the lower wall together by welding to form a weld joint between the upper wall and the lower wall. The method includes wrapping the metal liner with a fiber winding layer around an outer surface of the metal liner to form a hybrid tank.

In accordance with some embodiments, wrapping the metal liner with the fiber winding layer includes applying a pressure to the metal liner from within the cavity to oppose forces applied to the outer surface of the metal liner during wrapping. The pressure applied to the metal liner from within the cavity can be greater than 50 psi. The metal liner can define a longitudinal liner axis. Wrapping the metal liner with the fiber winding layer can include wrapping the fiber winding layer helically and circumferentially with respect to the longitudinal liner axis around the outer surface of the liner. The method can include priming the outer surface of the metal liner before wrapping the metal liner with the fiber winding layer. The method can include heat curing the hybrid tank after wrapping the metal liner with the fiber winding layer.

These and other features of the systems and methods of the subject invention will become more readily apparent to those skilled in the art from the following detailed description of the embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, embodiments thereof will be described in detail herein below with reference to certain figures, wherein.

DETAILED DESCRIPTION

Figure 1:
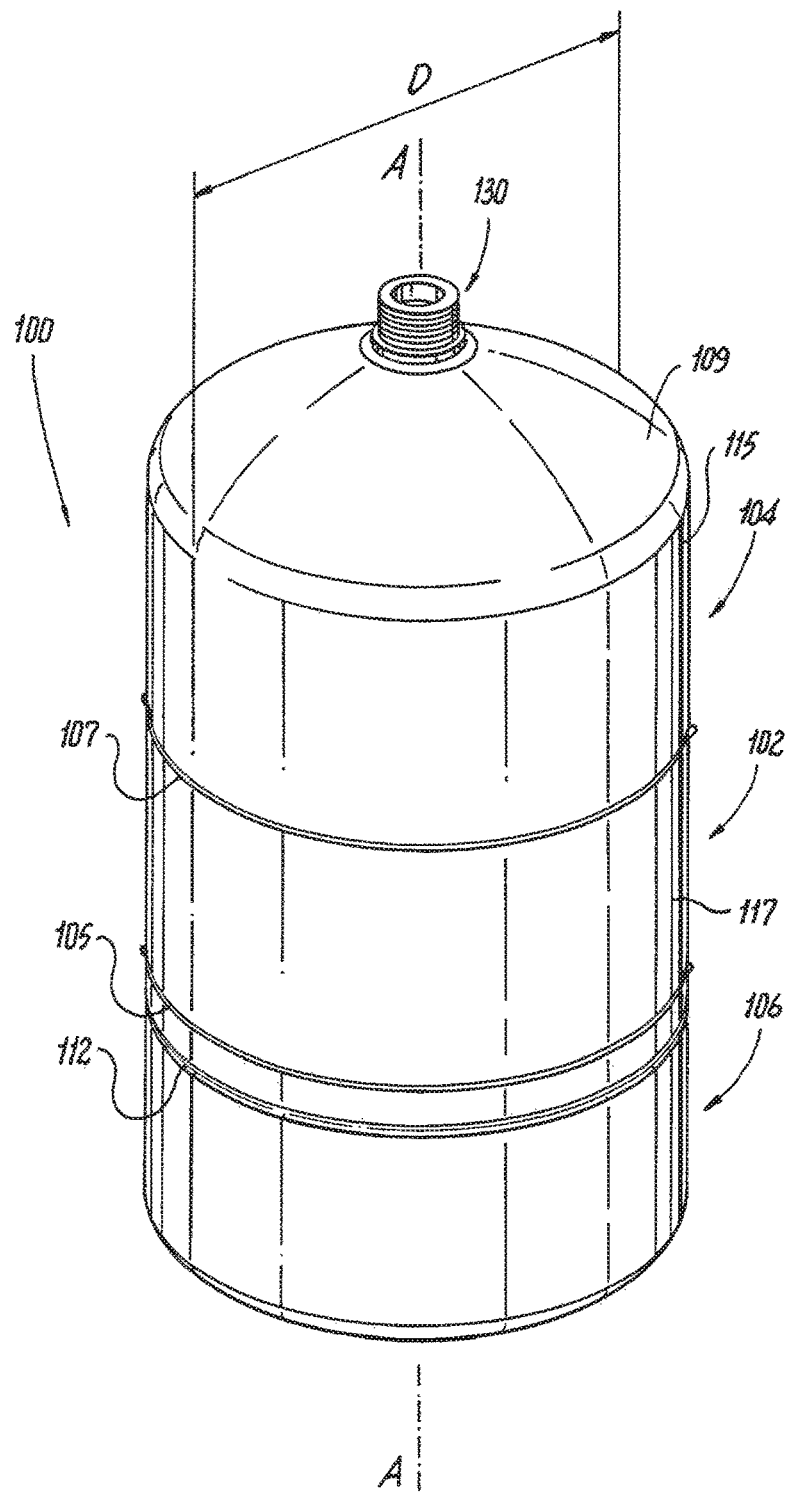
FIG. 1. is a perspective view of a portion of an embodiment of a fluid tank constructed in accordance with the present disclosure, showing upper and lower walls of the liner welded together.

Reference will now be made to the drawings wherein like reference numerals identify similar structural features or aspects of the subject invention. For purposes of explanation and illustration, and not limitation, a partial view of an exemplary embodiment of the commercial hybrid tank in accordance with the invention is shown in FIG. 1 and is designated generally by reference character 100. Other embodiments of the tank 100 in accordance with the invention, or aspects thereof, are provided in FIGS. 2-5 as will be described.

Figure 2:
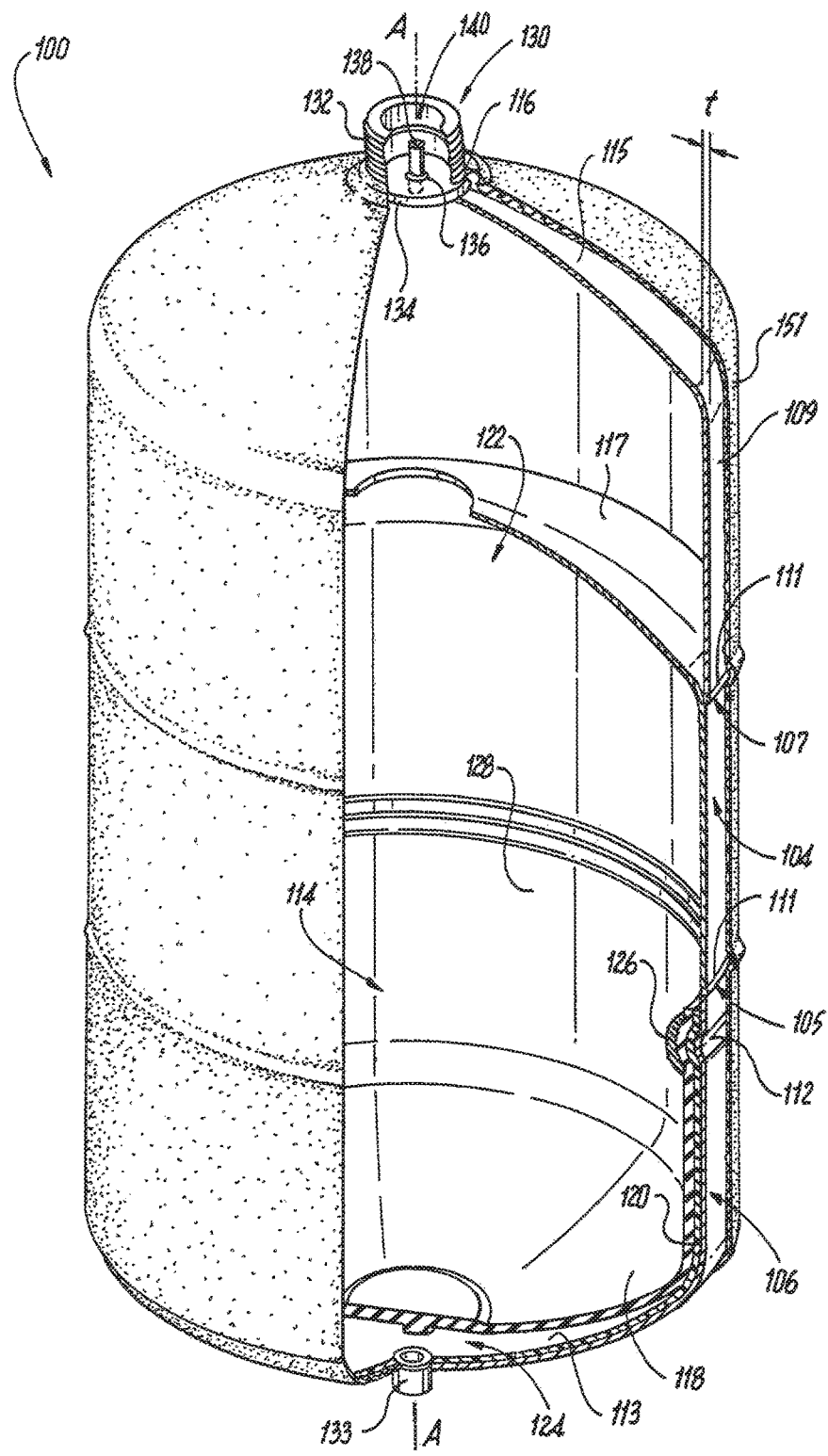
FIG. 2 is a partial cross-sectional view of the fluid tank of FIG. 1, showing the flexible diaphragm positioned within the cavity connected to an inner diameter surface of the lower wall.

As shown in FIGS. 1 and 2, commercial hybrid fluid tank 100 includes a metal liner 102 defined by an upper wall 104 and a lower wall 106. A fiber winding layer 151, shown in FIG. 2, is around an outer surface 109 of metal liner 102, therein creating the hybrid (combination of metal and fiber) tank. Fiber winding layer 151 provides resistance to internal pressure such that metal liner 102 can be thinner, creating a lighter weight fluid tank 100. Commercial hybrid tank 100 can be used in, for example, a commercial boiler or water system. Liner 102 defines a longitudinal liner axis A. Upper wall 104 and lower wall 106 define a cavity 114 there between. A weld joint 105 joins upper and lower walls, 104 and 106, respectively, to form a hermetically sealed joint there between. Upper wall 104 includes an upper dome 115 and a dome extension 117. It is contemplated that dome extension 117 can also be a cylindrical extension. Those skilled in the art will readily appreciate that depending on the desired length of the tank, any number of dome extensions 117 or other cylindrical extensions can be used. Or, dome extension 117 can be omitted and upper dome 115 can be welded directly to lower wall 106.

With continued reference to FIGS. 1 and 2, weld joint 105 is a first weld joint 105 and upper wall 104 includes a second weld joint 107 defined between upper dome 115 and dome extension 117 bonding upper dome 115 to dome extension 117. First weld joint 105 is defined between dome extension 115 of upper wall 104 and lower wall 106 of liner 102. Weld joints 105 and 107 include a respective weld bead 111. Weld beads 111 extend radially outward from outer surface 109 of the metal liner 0.125 inches or less. This limit assists with creating a transition for the fiber winding layer 151 and tends to reduce gaps from forming between metal liner 102 and fiber winding layer 151, which may lead to movement of metal liner 102 when tank 100 is under internal pressure.

As shown in FIG. 2, fluid tank 100 includes flexible diaphragm 118 positioned within cavity 114 connected to an inner diameter surface 120 of lower wall 106. Diaphragm 118 separates cavity 114 into upper portion 122 and a lower portion 124. Upper portion 122 of cavity 114 is sealed to contain a pressurized gas and lower portion 124 is sealed to contain a pressurized liquid. Fluid tank 100 includes an inner hoop ring 126 operatively connected to an inner surface 128 of flexible diaphragm 118 to hold flexible diaphragm 118 in place against lower wall 106. Lower wall 106 includes a hoop groove 112 that mates with inner hoop ring 126 to pinch flexible diaphragm 118 between the hoop groove 112 of lower wall 106 and inner hoop ring 126. Liner 102 includes an opening 116 with a connector 130 positioned therein. Connector 130 is defined in upper wall 104 of the liner 102. Connector 130 includes a central collar 132 operatively connected to opening 116 of liner 102. Central collar 132 defines a longitudinal axis, the same as axis A, and an axial passage 140. A support plate 134 is nested within opening 116 of the liner 102 axially below central collar 132. Support plate 134 includes a hole 136 defined with an air stem 138 extending therethrough and through axial passage 140 of central collar 132. A water connector 133 is defined in lower wall 106 of the liner 102.

As shown in FIG. 2, in some embodiments, tan k 100 can include an inner lower plastic liner 113 that corresponds to the shape of lower wall 106. The lower plastic liner 113 is disposed radially between diaphragm 118 and lower wall 106 and is simultaneously held by inner hoop ring 126 to form a corrosion resistant volume in lower portion 124 for the pressurized liquid in an open fluid system condition, e.g. for potable water applications.

With continued reference to FIGS. 1 and 2, metal liner 102 has an outer diameter D ranging from 11 to 26 inches. A ratio of a wall thickness t of metal liner 102 to outer diameter D of at least one of upper wall 104 or lower wall 106 ranges from 0.0028 to 0.0032. For example, tank 100 with an outer diameter of 26 inches can have a thickness of 0.073 inches, tank 100 with a diameter of 22 inches can have a thickness of 0.062 inches, tank 100 with an outer diameter of 15 inches can have a thickness of 0.043 inches, and tank 100 with an outer diameter of 11 inches can have a thickness of 0.035 inches. Tank 100 has a pressure rating of up to 300 psi at 240° F. Metal liner 102 alone has rating of 125 psi at 240° F. and has a burst strength that is higher than the maximum 300 psi rating. Tank 100 is configured to withstand a hydrostatic pressure test of five times its pressure rating at 240° F., for example, 1500 psi at 240° F.

Figure 3:
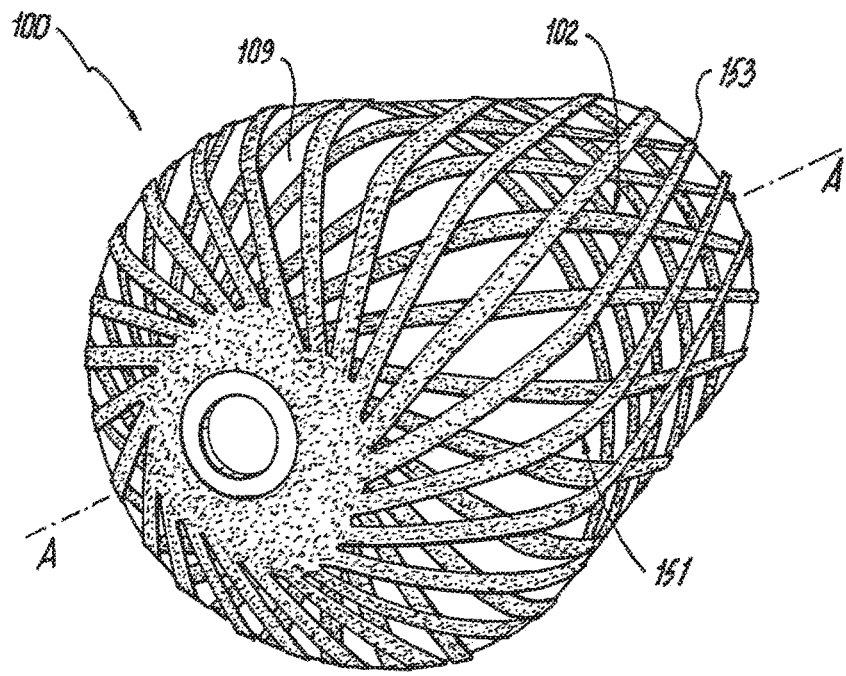
FIG. 3 is a perspective view of the fluid tank of FIG. 1, showing the fluid tank with circumferential and helical fiber windings around the outer surface of the liner.
Figure 4:
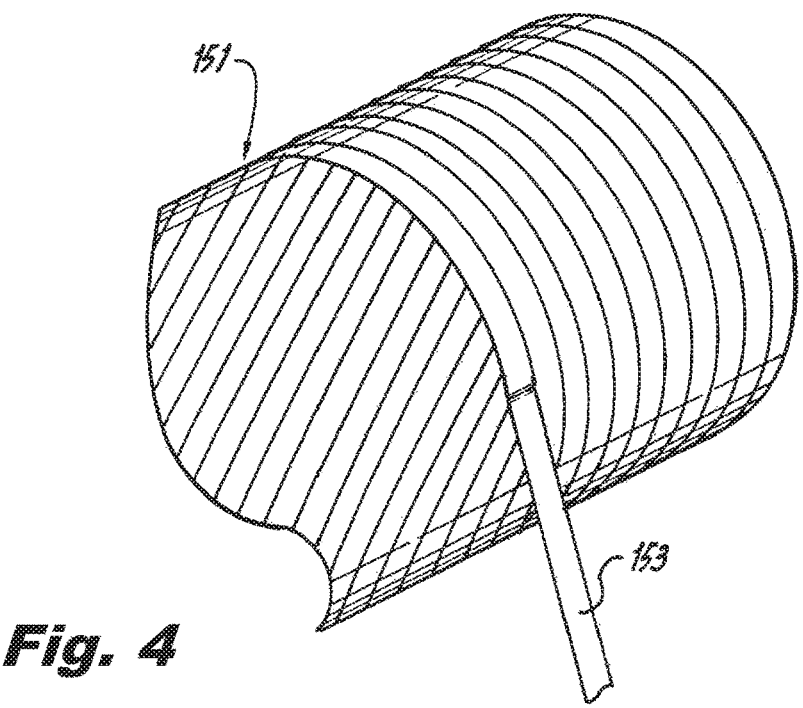
FIG. 4 is a perspective view of the fluid tank of FIG. 1, showing the fluid tank with circumferential and helical fiber windings around the outer surface of the liner.

As shown in FIGS. 3 and 4, fiber winding layer 151 is formed of fiber windings 153 helically and circumferentially wrapped with respect to the longitudinal liner axis A around outer surface 109 of liner 102. Wrapping fiber winding layer 151 around metal liner 102 (combined with the thinner deep drawn upper and lower walls 104 and 106 of liner 102) allows for a light-weight pressure vessel with reduced material cost. For example, it can be up to sixty-percent lighter than traditional commercial water tanks that are typically just constructed from metal. Fiber winding layer 151 also assists in resisting corrosion of the metal liner 102 and assists in insulating metal liner 102 to reduce heat loss in a boiler application. It also assists with ease of installation due to the reduced weight as compared with standard commercial pressure vessels. Metallic liner 102 and fiber winding layer 151 work together to produce a higher maximum working pressure tank than traditional commercial tanks that only include steel liners. Tank 100 may be constructed in a horizontal or vertical configuration with ratings up to 300 psi at 240° F. Fiber winding layer 151 includes multiple layers of fiber windings 153 that are helically and circumferentially wrapped with respect to a longitudinal axis A of liner 102. FIG. 3 shows tank 100 partially wrapped with fiber winding layer 151. FIG. 4 shows tank 100 in an almost completed form with helical wrappings completed and circumferential wrapping is in process.

Figure 5:
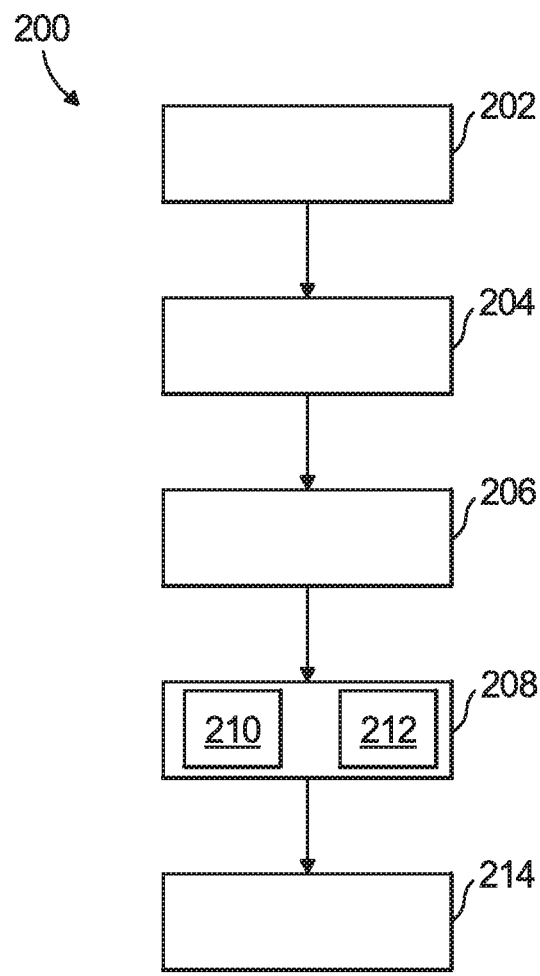
FIG. 5 is a flowchart of an exemplary method for assembling a fluid tank in accordance with an embodiment of the present disclosure, showing operations joining the liner together.

As shown in FIG. 5, a method 200 for manufacturing a commercial hybrid tank, e.g. tank 100, includes overlapping surfaces of an upper wall, e.g. upper wall 104, and a lower wall, e.g. lower wall 106, to form a metal liner, e.g. metal liner 102, defining a cavity, e.g. cavity 112, as shown schematically by box 202. Method 200 includes joining the surface of the upper wall and the surface of the lower wall together by welding to form a weld joint, e.g. weld joint 105, between the upper wall and the lower wall, as shown schematically by box 204.

With continued reference to FIG. 5, method 200 includes priming the outer surface of the metal liner before wrapping the metal liner with a fiber winding layer, e.g. fiber winding layer 151, as shown schematically by box 206. Method 200 includes wrapping the metal liner with the fiber winding layer around an outer surface, e.g. outer surface 109, of the metal liner to form the hybrid tank, as indicated schematically by box 208. Wrapping the metal liner with the fiber winding layer includes applying a pressure to the metal liner from within the cavity to oppose forces applied to the outer surface of the metal liner during wrapping, as shown schematically by box 210. The pressure applied to the metal liner from within the cavity is greater than 50 psi. Wrapping the metal liner with the fiber winding layer includes wrapping the fiber winding layer helically and circumferentially with respect to the longitudinal liner axis around the outer surface of the liner, as shown schematically by box 212. Method 200 includes heat curing the hybrid tank after wrapping the metal liner with the fiber winding layer, as shown schematically by box 214.

The methods and systems of the present invention, as described above and shown in the drawings, provide for commercial well and boiler tanks with superior properties including reduced manufacturing costs, improved durability, reduced weight, increased corrosion resistance, and improved performance in outdoor environments. While the apparatus and methods of the subject invention have been shown and described with reference to certain embodiments, those skilled in the art will readily appreciate that changes and/or modifications may be made thereto without departing from the spirit and scope of the subject invention.

What is claimed is:

1. A commercial hybrid tank, comprising:
a metal liner comprising an upper wall and a lower wall, the upper wall and the lower wall defining a cavity therebetween, and the lower wall including a radially inwardly extending hoop groove;
a weld joint joining the upper and lower walls together;
a fiber winding layer wrapped around an outer surface of the metal liner;
a flexible diaphragm positioned within the cavity connected to an inner diameter surface of the lower wall, the diaphragm separating the cavity into an upper portion and a lower portion;
an inner hoop ring that mates with the hoop groove in the lower wall to hold the flexible diaphragm in place against the lower wall between the hoop ring and the lower wall,
wherein the upper portion of the cavity is sealed to contain a pressurized gas and the lower portion is sealed to contain a pressurized liquid; and
wherein the upper wall includes an upper dome and at least one of a dome extension or a cylindrical extension, wherein the weld joint is a first weld joint and the upper wall includes a second weld joint defined between the upper dome and at least one of the dome extension or the cylindrical extension bonding the upper dome and at least one of the dome extension or the cylindrical extension together.

2. The tank of claim 1, wherein the metal liner has an outer diameter ranging from 11 to 26 inches.

3. The tank of claim 1, wherein a ratio of a wall thickness of the metal liner to an outer diameter of at least one of the upper wall or lower wall ranges from 0.0028 to 0.0032.

4. The tank of claim 1, wherein the tank has a pressure rating of up to 300 psi at 240° F.

5. The tank of claim 1, wherein the tank can withstand a hydrostatic pressure test of five times its pressure rating at 240° F.

6. The tank of claim 1, wherein the liner defines a longitudinal liner axis, wherein the fiber winding layer is formed of fiber windings helically and circumferentially wrapped with respect to the longitudinal liner axis around the outer surface of the liner.

7. The tank of claim 1, wherein the first weld joint is defined between at least one of the dome extension or the cylindrical extension of the upper wall and the lower wall of the liner.

8. The tank of claim 1, wherein the liner includes an opening with a connector positioned therein.

9. The tank of claim 8, wherein the connector is defined in the upper wall of the liner and includes:
a central collar operatively connected to the opening of the liner, wherein the central collar defines a longitudinal axis and an axial passage;
a support plate nested within the opening of the liner axially below the central collar, the support plate including a hole defined therein; and
an air stem extending from the hole of the support plate through the axial passage of the central collar.

10. The tank of claim 8, wherein the connector is defined in the lower wall of the liner.

11. The tank of claim 1, wherein the lower wall includes a lower dome.

12. The tank of claim 1, wherein the weld joint includes a weld bead, wherein the weld bead extends radially outward from the outer surface of the metal liner 0.125 inches or less.

13. The tank of claim 1, further including an inner lower plastic liner disposed radially between the diaphragm and the lower wall, wherein the inner lower plastic liner is held by the inner hoop ring to form a corrosion resistant volume.

14. A commercial hybrid tank, comprising:
a metal liner comprising an upper wall and a lower wall, the upper wall and the lower wall defining a cavity therebetween;
a weld joint joining the upper and lower walls together;
a fiber winding layer wrapped around an outer surface of the metal liner;
a flexible diaphragm positioned within the cavity connected to an inner diameter surface of the lower wall, the diaphragm separating the cavity into an upper portion and a lower portion;

an inner hoop ring operatively connected to an inner surface of the flexible diaphragm to hold the flexible diaphragm in place against the lower wall;

an inner lower plastic liner disposed radially between the diaphragm and the lower wall, the inner lower plastic liner being held by the inner hoop ring; and wherein the upper wall includes an upper dome and at least one of a dome extension or a cylindrical extension, wherein the weld joint is a first weld joint and the upper wall includes a second weld joint defined between the upper dome and at least one of the dome extension or the cylindrical extension bonding the upper dome and at least one of the dome extension or the cylindrical extension together.

15. The tank of claim 14, wherein the first weld joint is defined between at least one of the dome extension or the cylindrical extension of the upper wall and the lower wall of the liner.

16. The tank of claim 14, wherein the weld joint includes a weld bead, wherein the weld bead extends radially outward from the outer surface of the metal liner 0.125 inches or less.

\* \* \* \* \*